US006384827B1

(12) United States Patent
Dawkins

(10) Patent No.: US 6,384,827 B1
(45) Date of Patent: May 7, 2002

(54) METHOD OF AND AN APPARATUS FOR GENERATING A DISPLAY

(75) Inventor: Derek F. Dawkins, Vermont South (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,225

(22) Filed: Sep. 3, 1999

(30) Foreign Application Priority Data

Sep. 8, 1998 (AU) .............................................. PP5748

(51) Int. Cl.$^7$ .............................................. G06T 11/00
(52) U.S. Cl. ....................................................... 345/467
(58) Field of Search ................................ 345/141, 352, 345/357, 467, 471, 472, 472.1, 472.2, 472.3

(56) References Cited

U.S. PATENT DOCUMENTS 4,283,724 A * 8/1981 Edwards ..................... 340/731
6,208,342 B1 * 3/2001 Mugura et al. ............. 345/339

FOREIGN PATENT DOCUMENTS

GB          2 333 215 A          7/1999

* cited by examiner

*Primary Examiner*—Matthew Luu
*Assistant Examiner*—Greg Cunningham
(74) *Attorney, Agent, or Firm*—Sughrue Mion, PLLC

(57) ABSTRACT

A method of generating a display to enable the user to be able to easily navigate a complex menu structure on a small display screen. The method of generating a display comprises the steps of receiving data representing lines of characters to be displayed, applying one font to one line of the lines, applying another font, smaller than the one font, to the remaining lines of the lines, truncating an upper part of a top line of the lines, truncating a lower part of a bottom line of the lines, and displaying the lines on the screen. This method can be used for generating a character display for navigation of a menu structure on the screen of a mobile telephone.

10 Claims, 2 Drawing Sheets

METHOD OF AND AN APPARATUS FOR GENERATING A DISPLAY

BACKGROUND OF THE INVENTION

1. Field of the Invention

The present invention relates to a method of generating a display and an apparatus for executing the method. The method is particularly, but not exclusively, useful for generating a character display on the screen of a mobile telephone.

2. Description of the Related Art

The size of a liquid crystal display (LCD) screen of a mobile telephone is restricted by the physical dimensions of the phone, which are continuing to reduce with every new model released. Although a greater number of pixels, and hence a greater number, albeit smaller, characters are available with current LCD screens, the reduced readability of these screens has proven disadvantageous. Furthermore, increased pixel capacity in an LCD gives rise to an increase in complexity and cost. Both of these factors present particular difficulties for phones of more complex mobile systems, such as GSM (global system for mobile communication), which dictate many mandatory or expected functions that require a complex menu structure to be displayed to present the functions to a user. Any display difficulties make it inherently difficult to navigate through the menu structures. The same problems occurs in any device which has a small display screen that needs to display a number of characters for navigation of a menu structure. It is desired to provide a method and apparatus to overcome these difficulties or at least provide a useful alternative.

SUMMARY OF THE INVENTION

An object of the present invention is to provide a method of generation a display to enable a user to be able to easily navigate a complex menu structure on a small display screen.

Another object of the present invention is to provide an apparatus for generating a display to enable a user to be able to easily navigate a complex menu structure on a small display screen.

In accordance with the present invention there is provided a method of generating a display on a display screen, including:

receiving data representing lines of characters to be displayed;

applying one font to one line of said lines;

applying another font, smaller than said one font, to the remaining lines of said lines;

truncating an upper part of a top line of said lines;

truncating a lower part of a bottom line of said lines; and displaying said lines on said screen.

Preferably the one line is a center line between said top and bottom lines. Advantageously, the one line is a selected line of a menu. Preferably the selected line is highlighted. Advantageously, a different one of said lines can be displayed in the position of the selected line, and with the one font, by scrolling through said menu.

The present invention also provides an apparatus having a display screen and processing means for executing the method described above. Advantageously, the apparatus may be a portable hand held device, such as a mobile telephone, and the display screen may be a small LCD screen.

The above and other objects, features, and advantages of the present invention will become apparent from the following description referring to the accompanying drawings which illustrate an example of a preferred embodiment of the present invention.

BRIEF DESCRIPTION OF THE DRAWINGS

A preferred embodiment of the present invention is hereinafter described, by way of example only, with reference to the accompanying drawings, wherein.

DESCRIPTION OF THE PREFERRED EMBODIMENT

Mobile telephones may be as small as about 70 cm$^3$ with common models being about 100 cm$^3$. In the smallest phones, the LCD screens are typically able to display two lines of ten or twelve English characters in length, or five or six Chinese characters in length. Larger telephones may display five lines with a similar number of characters. In Chinese this is usually accompanied with a reduction in font resolution from a desirable standard figure of about 16×16 pixels per character to 11×12 pixels per character. This tends to seriously affect the ability to easily navigate a series of commands or menu items forming a menu, which may be part of a number of menus forming a menu structure. The reduction in resolution tends to result in only one to three menu items displayed, and this provides the user with difficulties in being able to determine a current position within the menu structure. One technique for alleviating this lack of "menu position feel" is to use arrow symbols which indicate that more menu items are available in the direction of the illuminated arrows in the display. The arrows may be represented graphically in the text field of the screen, or displayed as icons outside the text field, such as in the mobile phones of NEC Corporation, PDC N206, G9 and G9-C. Another technique involves including a scroll bar at the side of the menu item display with a position pointer indicating how far down the menu the currently displayed item is positioned. All of these techniques use additional LCD resources and occupy additional area in the display screen, and do not overcome the fact that more menu items cannot be displayed.

The method and telephone described hereinafter seek to enable the user to be able to see a greater range of menu items on the display screen, without requiring a larger or more complex LCD. The new display generated also seeks to give the user a greater feeling of the position of the currently displayed item in a menu.

The method involves firstly applying an optimal font size to the menu item which is currently of interest, which normally on most displays, is highlighted, flashing or denoted by a cursor position. Menu items which are normally positioned directly above and below the currently selected menu item of interest are displayed with a reduced font size, i.e., a reduced quality font. Secondly, the spare screen resource provided by the reduced quality font is used to display additional menu items at the top and bottom of the display, with both the top and bottom menu items being truncated in half, as shown in FIG. 1.

Figure 1:
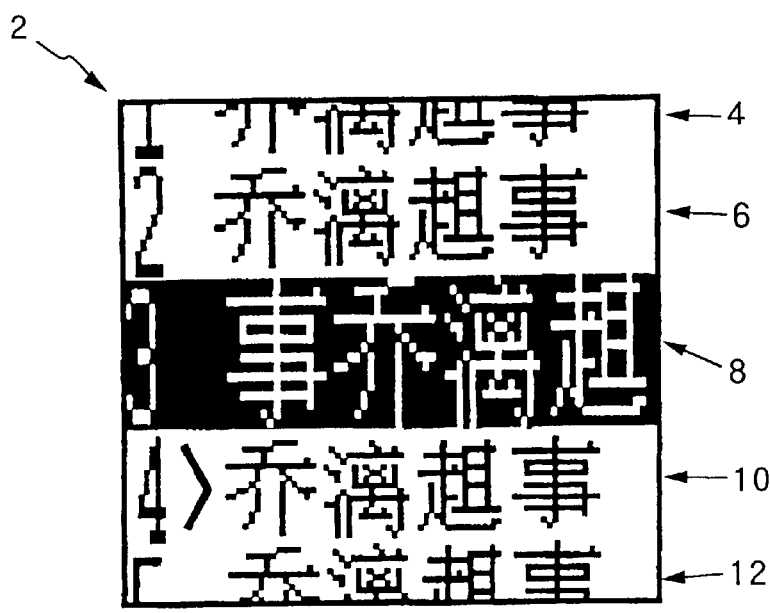
FIG. 1 is a diagram of a display generated using a preferred embodiment of a mobile telephone.

The method is able to produce a display 2, as shown in FIG. 1, where an 80×48 pixel screen is able to display five lines 4, 6, 8, 10 and 12 of Chinese character menu items. The center selected menu item 8 is highlighted and displayed with a characteristic 15×14 pixel font, whilst the remaining lines 4, 6, 10 and 12 have the characters displayed with a sub-optimal and smaller 11×12 pixel font. The top menu item 4 is truncated by removing its top half, whereas the bottom item 12 is truncated by removing its bottom half.

The method uses a characteristic of visual perception, in that a user is normally focused on the line of interest 8, and will neither perceive nor be concerned about the lack of resolution in the remaining lines 4, 6, 10 and 12. Also the user is able to readily interpret the top line 4 and the bottom line 12, as the content displayed is generally familiar to the user, and human character recognition can succeed even when great character distortion is present, such as is the case with handwritten characters. Accordingly, the user perceives that the display 2 is able to display more menu items.

Figure 2:
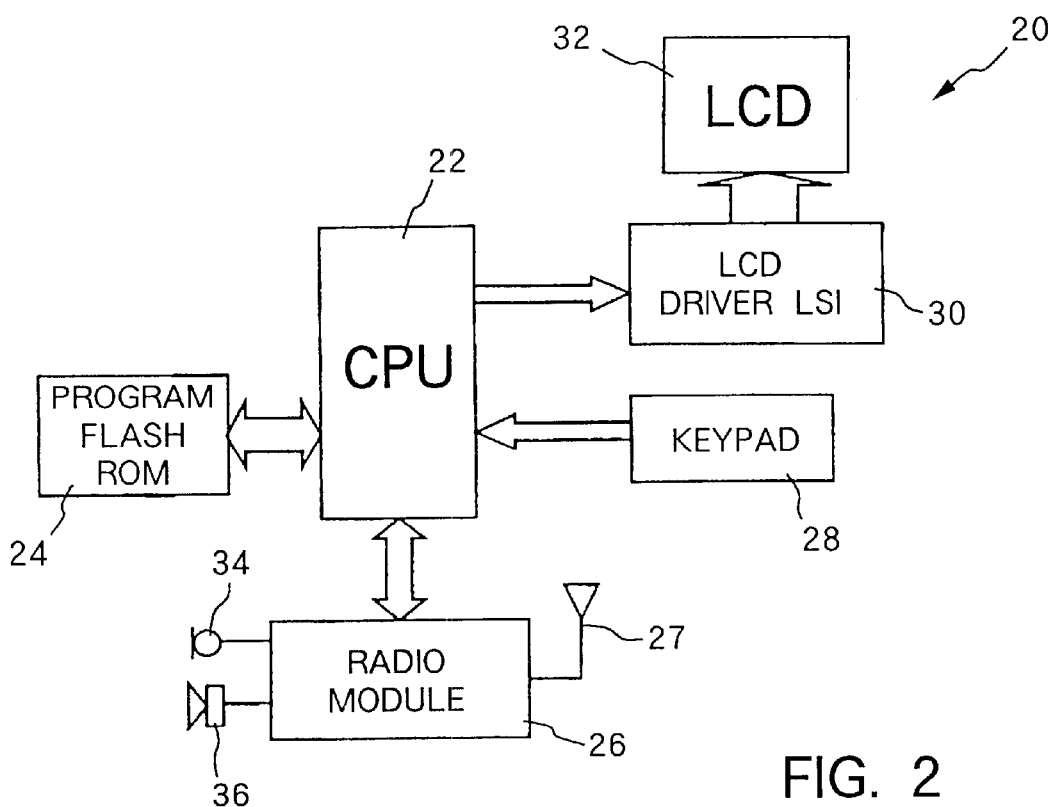
FIG. 2 is a block diagram of the hardware components of the mobile telephone.
Figure 3:
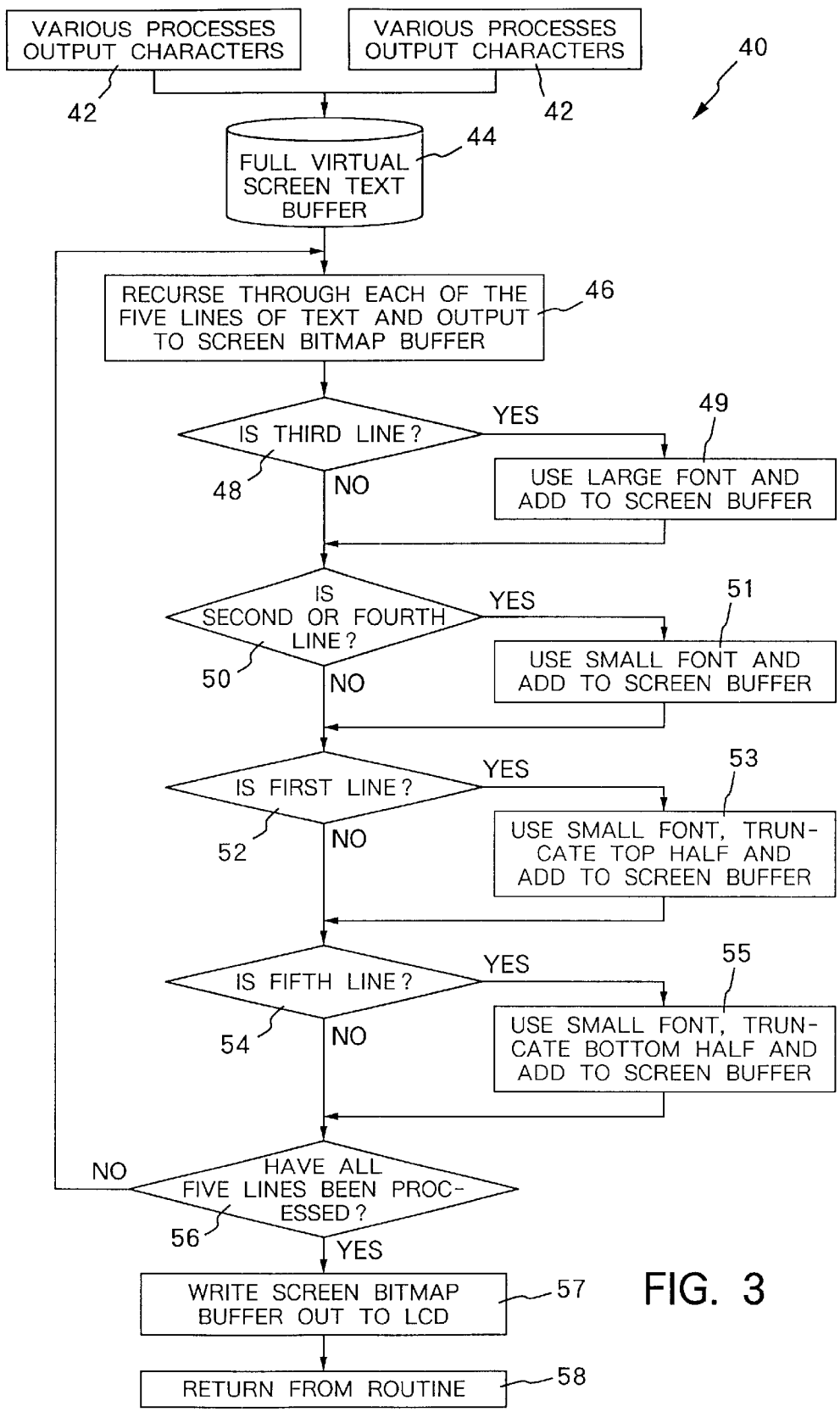
FIG. 3 is a flow diagram of a preferred embodiment of a process executed by the mobile telephone to generate a display.

The method is executed on a mobile telephone 20 which includes the standard hardware components of a mobile telephone, as shown in FIG. 2. The components include a central processing unit (CPU) 22 which communicates with a program flash ROM 24 and a radio module 26. The CPU 22 is responsive to inputs received from a keypad 28 of the phone 20 and generates and forwards display data to an LCD driver integrated circuit 30. The CPU 22 is provided with a memory location for storing character data and a screen buffer location for storing bitmap data. The LCD driver 30 generates a display on an LCD screen 32 of the phone in accordance with the display data provided by the CPU 22. The radio module 26 includes a transceiver for transmitting and receiving radio signals on an antenna 27 of the phone 20 and also includes a modulator and demodulator (modem) for receiving and outputting voice signals from and to a microphone 34 and a speaker 36, respectively, of the phone 20. The ROM 24 includes executable code which controls operation of the hardware components of the phone 20 and, in particular, controls execution of a display generation process 40, as shown in FIG. 3. The display process 40 is executed by the CPU 22, which allows a standard LCD driver 30 to be used, but the process could be executed by either component or both the CPU 22 and the LCD driver 30, which can be integrated into one integrated circuit.

The display process 40 is invoked by the phone 20 after the phone 20 executes one of various processes 42 which generate display data representing characters to be displayed on the screen 32. At step 44, the process 40 receives the character data from the process 42 and uses the memory location (text buffer) to store the character data representing five lines of text for the screen 32. The process 40 then processes each line of the text to generate a screen bitmap, which is begun at step 46 and involves different processing at steps 48 to 54, depending on which position a line has in the five lines 4, 6, 8, 10 and 12. If it is determined at step 48 that the line being processed is the menu selected line, i.e., the third line 8, then a large font is applied and the new character data added to a screen buffer location at step 49. If at step 50, it is determined that the line is the second or fourth lines 6 or 10, then a smaller font is applied and the new character data added to the screen buffer location at step 51. If it is determined at step 52 that the line is the first line 4, then the smaller font is applied and the text of the line is truncated so as to remove its top half, as shown in FIG. 1, and the new representative character data is then added to the screen buffer location at step 53. If, at step 54, the line is determined to be the fifth line 12 in the text to be displayed, the small font is applied and the text to be displayed for the line is truncated, this time by removing the bottom half of the text, as shown in FIG. 1, and the new character data is then added to the screen buffer location at step 55. At step 56, if it is determined that all five lines of the text to be displayed have been processed, then the character data in the screen buffer location is written out by the CPU 22 to the LCD driver 30 and the text is displayed on the screen 32 as shown in FIG. 1 at step 57. If all of the five lines have not been processed, operation returns to step 46 to access the next line in the text. After the adjusted character data has been written to the LCD driver 30 from the screen bitmap buffer location, the process 40 end at step 58.

Many modifications will be apparent to those skilled in the art without departing from the scope of the present invention as recited in the appended claims.

What is claimed is:

1. A method of generating a display on a display screen, comprising the steps of:

receiving data representing lines of characters to be displayed;

applying one font size to one line of said lines;

applying only another single font size, smaller than said one font size, to each of the remaining ones of said lines;

truncating to omit an upper part of a top line of said lines;

truncating to omit a lower part of a bottom line of said lines; and displaying said lines on said display screen.

2. A method of generating a display according to claim 1, wherein said one line is a center line between said top and bottom lines.

3. A method of generating a display according to claim 1, wherein said one line is a selected line of a menu.

4. A method of generating a display according to claim 3, wherein said selected line is highlighted.

5. A method of generating a display according to claim 3, wherein a different one of said lines can be displayed in the position of the selected line, and with said one font, by scrolling through said menu.

6. An apparatus for generating a display, comprising:

a display screen; and a processing means for receiving data representing lines of characters to be displayed, applying one font size to one line of said lines, applying only another single font size, smaller than said one font size, to each of the remaining ones of said lines, truncating to omit an upper part of a top line of said lines, and displaying said lines on said display screen.

7. An apparatus for generating a display according to claim 6, wherein said display screen is an LCD screen.

8. An apparatus for generating a display according to claim 6, wherein said apparatus is a portable hand held device.

9. An apparatus for generating a display according to claim 6, wherein said apparatus is a mobile telephone.

10. An apparatus for generating a display according to claim 8, wherein said display screen is an LCD screen.

\* \* \* \* \*